US005117176A

United States Patent [19]

Bobry

[11] Patent Number: 5,117,176

[45] Date of Patent: May 26, 1992

[54] ALTERNATING CURRENT CONDITIONER

[76] Inventor: Howard H. Bobry, 341 3rd Ave. S., Edmonds, Wash. 98020

[21] Appl. No.: 620,575

[22] Filed: Nov. 6, 1990

[51] Int. Cl.$^{5}$ ........................ C05F 3/06; H01F 27/24

[52] U.S. Cl. .................................. 323/308; 323/331; 323/362

[58] Field of Search ............... 323/250, 331, 362, 308

[56] References Cited

U.S. PATENT DOCUMENTS

| | | | |
|---|---|---|---|
| 2,760,145 | 8/1956 | Dunn | 323/250 |
| 3,371,263 | 2/1968 | Walz et al. | 363/100 |
| 3,573,606 | 4/1971 | Hart et al. | 323/248 |
| 4,308,495 | 12/1981 | Yasumura | 323/250 |
| 4,939,430 | 7/1990 | Droho | 315/291 |

FOREIGN PATENT DOCUMENTS

| | | | |
|---|---|---|---|
| 986377 | 3/1951 | France | 323/308 |
| 1386702 | 12/1964 | France | 323/308 |

*Primary Examiner*—Steven L. Stephan
*Assistant Examiner*—Davidson
*Attorney, Agent, or Firm*—Pearne, Gordon, McCoy & Granger

[57] ABSTRACT

An alternating current conditioner is provided with a magnetic structure that provides smoothing, transient suppression, ride through and power factor correction. The structure has a gapped magnetic core and primary and secondary windings. A shunt is provided between the primary and secondary, with the gap being on the primary side. A capacitor is in series with the secondary winding. The capacitor and the shunt inductance provide an LC low pass filter. The inductance caused by the gap cancels the capacitive effect of the LC filter.

4 Claims, 2 Drawing Sheets

ALTERNATING CURRENT CONDITIONER

BACKGROUND OF THE INVENTION

This invention relates to a phase-switched power supply having a filtered alternating current output.

In regulated alternating current power supplies, it is often desirable to control the output voltage by phase dependently switching the input alternating current on and off by means of some switching means (e.g. SCRs or transistors). This results in a non-sinusodial alternating current. This output is adequate for applications where output waveform, transient reduction and ride through are of no importance. Lighting and heating loads are typical alternating current phase control applications.

Another approach to supplying regulated alternating current is to use a ferroresonant transformer. This approach uses a saturating transformer with a resonance capacitor to provide a constant voltage, sinusoidal output (i.e. adequately sinusodial). Large amounts of capacitive volt-amperes circulate in the tank circuit to drive the secondary section of the core into saturation. This core saturation and the large circulating volt-amperes increase transformer size and losses compared to unsaturated operation.

SUMMARY OF THE INVENTION

The present invention provides an alternating current conditioner having a single magnetic structure or transformer that effectively converts the non-sinusoidal input from a phase-switched alternating current source into a sinusoidal output.

The alternating current conditioner includes a magnetic core having a gap. Primary and secondary windings are located about the core, which provides a common magnetic path for fluxes created by the windings.

A magnetic shunt is also provided between the primary and secondary windings. The shunt provides an alternate magnetic path for the primary and secondary flux. The gap in the core is located on the primary side of the shunt.

A capacitor is connected in series relationship with the secondary winding.

In addition, a tap in the secondary winding is provided. Then application of a phase-switched alternating current to the primary winding results in a smoothed alternating current being available at the secondary tap without saturation of the core.

In an additional embodiment of the invention, a tap on the primary winding is provided. This allows portions of the phase-switched alternating current to be applied alternatively to either the entire primary winding or a portion thereof. This puts a more even demand on the alternating current source and lowers the losses in the primary of the transformer. Also, because output distortion is reduced, less filtering may be needed. This resluts in less circulating volt-amperes, thus improving efficiency.

In applications where isolation is not necessary, the primary and secondary windings can be interconnected. This results in nearly doubling the capacity of the conditioner.

DESCRIPTION OF THE PREFERRED EMBODIMENTS

Figure 1:
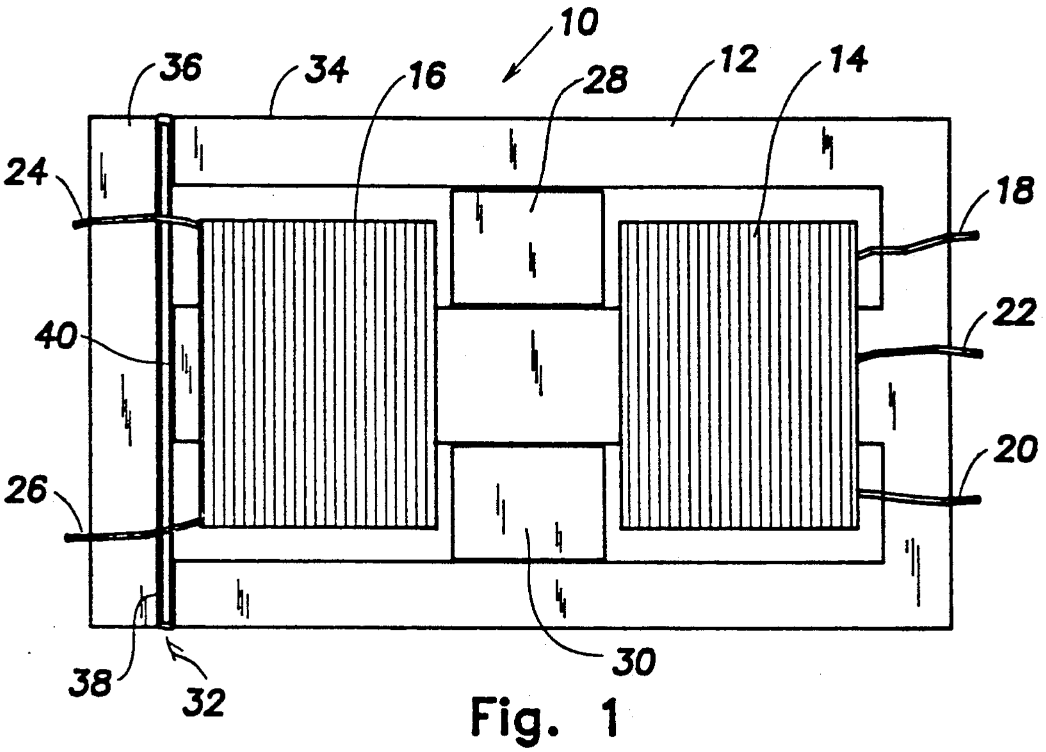
FIG. 1 is a plan view of a magnetic structure according to the invention.

Referring to FIG. 1, a magnetic structure 10 according to the invention is illustrated. A magnetic core 12 is provided with a secondary winding 14 and a primary winding 16.

The secondary winding 14 has end terminals 18, 20 and an intermediate tap 22. The primary winding 16 has end terminals 24, 26.

Magnetic shunts 28, 30 are provided between the secondary winding 14 and the primary winding 16. The shunts 28, 30 provide a path whereby a portion of the magnetic flux from the windings 14, 16 can bypass the opposite winding. The shunts 28, 30 may be, for example, stacks of thin steel laminations.

The core 12 has a gap 32 in the primary's magnetic path. In the preferred embodiment, the core 12 is formed from a stack of steel "E"s 34 and "I"s 36 as used in conventional transformer cores, except that here they are not alternately interlaced. The "E"s 34 are separated from the "I"s 36 by the gap 32. The gap 32 is formed by an insulating spacer 38 (e.g. paper) between the "E"s 34 and "I"s 36. The gap 32 could of course simply be air.

While the gap 32 has been shown between the "E"s 34 and the "I"s 36, it need only be located in the primary's magnetic path. For example, a toroidal transformer could be provided with a gap cut in the core on the primary side of a magnetic shunt between the primary and secondary windings.

Similarly, the core 12 of the structure 10 could be made continuous except for a gap at the primary end of the center leg 40.

Figure 2:
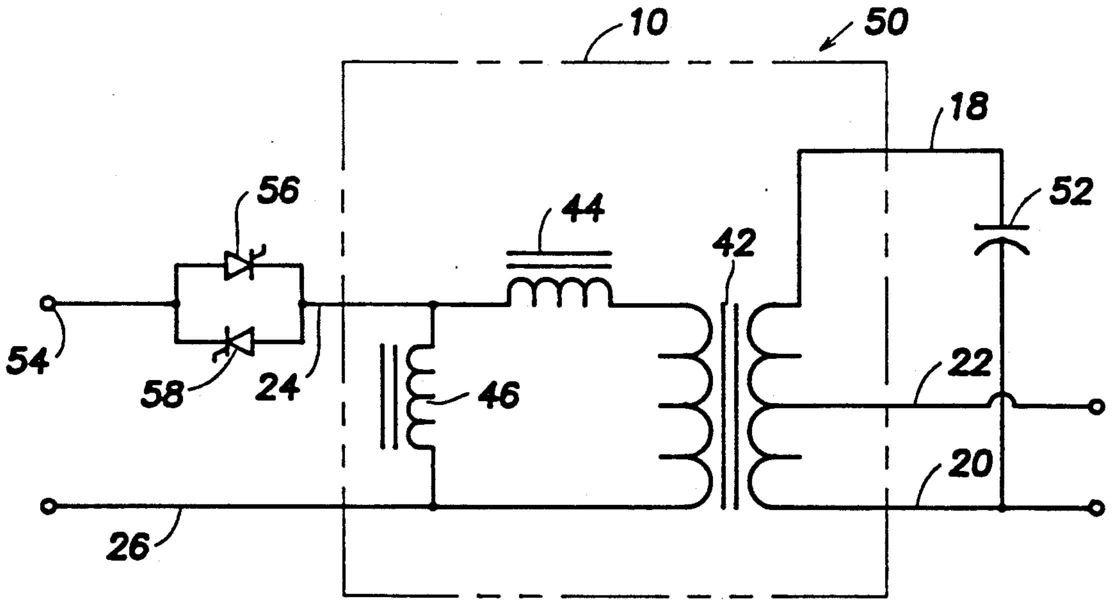
FIG. 2 is a schematic diagram of an alternating current conditioner according to the invention showing the equivalent circuit of the magnetic structure of FIG. 1.

Referring to FIG. 2, a schematic diagram of the equivalent circuit of the magnetic structure 10 of FIG. 2 is shown integrated into an alternating current conditioner 50.

The portion of the structure 10 that acts as a conventional transformer is indicated by the numeral 42.

The shunts 28, 30 provide an alternate path for the magnetic flux in the core 12. This parallel flux path is equivalent to a series inductance 44 (this inductance could be equivalently shown in series with the secondary circuit).

The gap 32 in the primary side of the structure 10 results in a parallel inductance 46.

A capacitor 52 is connected between the secondary winding end terminals 18, 20 and an output from the conditioner 50 is provided between the terminal 20 and the tap 22.

An alternating current input to the conditioner 50 is applied to the terminals 54, 26.

The terminal 54 is connected to switching means 56, 58 suitable for rapidly switching the alternating current input (e.g. line voltage) to the terminal 24 according to signals from an unshown control device. The switching means 56, 58 may be, for example, inverse parallel connected SCRs, or transistors.

Figure 3:
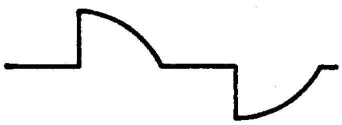
FIG. 3 is a graph of a typical input voltage to the magnetic structure of FIGS. 1 and 2.

As is well-known in the art, the firing angle of the switching means 56, 58 can be varied to produce a non-sinusoidal alternating current having a desired voltage. An exemplary non-sinusoidal voltage produced by this phase control switching is shown in FIG. 3. The non-sinusoidal voltage is applied to the terminals 24, 26.

The shunts 28, 30 and the value of the capacitor 52 are chosen such that the inductance 44 and the capacitor 52 form a resonant circuit at some frequency greater than the alternating current frequency applied at the terminals 54, 26, but less than the lowest harmonic of concern, generally the third (e.g. 150 Hz for a 60 Hz. input).

This forms an LC low pass filter which can reduce the distortion created by the phase control switching to a smoothed waveform approaching a sinusoid. This smoothing effect also provides excellent transient suppression.

This LC filter appears to be a capacitive load at the alternating current input frequency. However, the circulating current which would appear in the primary winding 16 due to this capacitive load is effectively cancelled by configuring the gap 32 such that the inductance 46 results in an inductive current flow that cancels the capacitive current. At no load, the conditioner 50 requires little, if any, input current. In addition, the power factor "seen" by the alternating current input supply is basically that of the load terminal 20 and tap 22.

This configuration of the inductances 44, 46 and the capacitor 52 also performs another important function. With the input to the conditioner 50 open circuited, they form a tank circuit resonant at the now absent alternating current input frequency (e.g. 60 Hz). The energy stored in this tank circuit is supplied to the output terminal 20 and tap 22 to provide a short period of ride through (e.g. 100 microseconds to several cycles). This ride through can provide a critical few moments of power during a short power failure or while switching to a backup power supply.

It should be noted that a ferroresonant transformer provides such waveform smoothing, ride through and transient suppression. However, a ferroresonant transformer requires large amounts of capacitive volt-amperes circulating in the tank circuit to drive the secondary section of the core into saturation. This core saturation and the large circulating volt-amperes increase transformer size and losses significantly when compared to the present invention, which is designed to avoid saturation.

Figure 4:
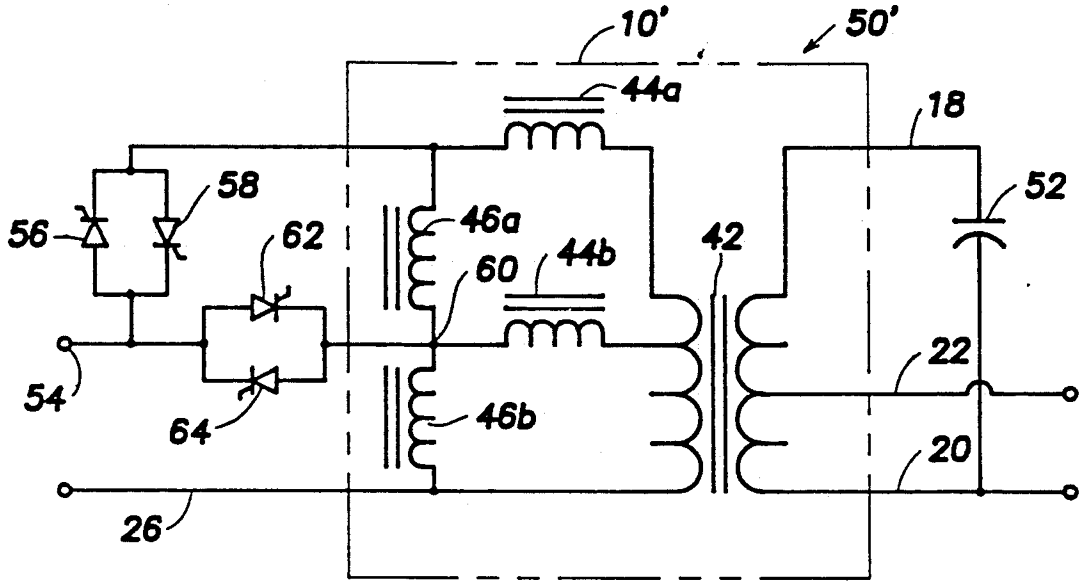
FIG. 4 is a schematic diagram of an additional embodiment of the invention.

Referring to FIG. 4, a schematic diagram of an additional embodiment of the invention is shown. In the magnetic structure 10′, a tap 60 is provided on the primary winding 16. This has the effect of splitting the inductances 44, 46 into the inductances 44*a*, 44*b* and the inductances 46*a*, 46*b*, respectively. While it may appear that adding the tap 60 would change the relationships between the inductances 44, 46 and the capacitance 52, this is not the case.

Figure 5:
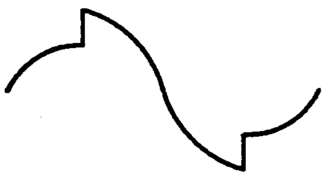
FIG. 5 is a graph of a typical point input voltage to the magnetic structure of FIG. 4.

Addition of the tap 60 allows switching means 62, 64 to be added between the terminal 54 and the tap 60. Like the switching means 56, 58, the switching means 62, 64 are controlled by signals from an unshown control device. In the conditioner 50, the alternating current input was either passed or blocked by the switching means 56, 58. In the conditioner 50′, when the alternating current input is blocked by the switching means 56, 58, it is passed by the switching means 62, 64. FIG. 5 shows an exemplary waveform of the primary voltage.

Because the primary voltage is not switched to zero in the conditioner 50′, the input current required by the conditioner 50′ is much less distorted. This avoids adverse effects on the power source and cuts losses in the primary.

In addition, the output is further smoother over that of the conditioner 50. This may reduce the need for further output filtering with its attendant lowering of efficiency.

Figure 6:
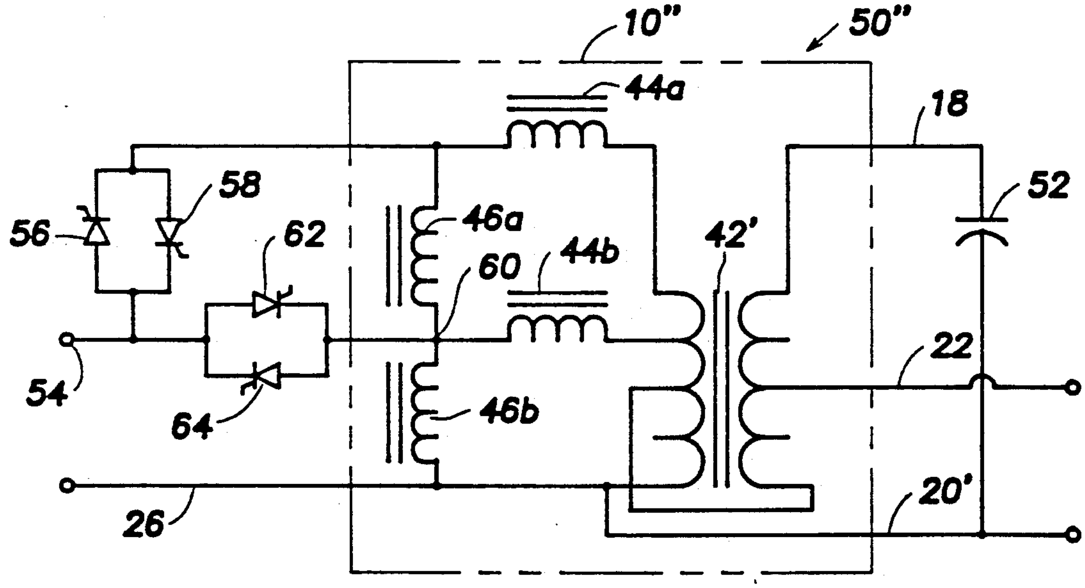
FIG. 6 is a schematic diagram of an additional embodiment of the invention.

Referring to FIG. 6, a schematic diagram of an additional embodiment of the invention is shown. In the conditioner 50″, the windings of the magnetic structure 10″ have been interconnected. A portion of the primary winding 16 is shared with the secondary winding 14.

This configuration nearly doubles the effective rating of the conditioner 50″ over the conditioner 50′. In addition, because the losses in the magnetic structure remain the same, the efficiency is increased to about 95%. This modification is particularly attractive because most applications of alternating current cconditioners do not require isolation and, in fact, requires defeating when provided.

It should be evident that this disclosure is by way of example and that various changes may be made by adding, modifyng or eliminating details without departing from the fair scope of the teaching contained in this disclosure. The invention is therefore not limited to particular details of this disclosure except to the extent that the following claims are necessarily so limited.

What is claimed:

1. An alternating current conditioner comprising:
- a magnetic core having a gap;
- a primary winding about said core;
- a secondary winding about said core, said core providing a common magnetic path for fluxes created by said primary and secondary windings, said common magnetic path passing through said gap;
- a magnetic shunt providing a shunt path for said primary flux and a shunt path for said secondary flux, said primary flux shunt path passing through said gap and said secondary flux shunt path bypassing said gap;
- a capacitor in series with secondary winding; and
- a tap on said secondary winding;
- means to apply a phase-switched alternating current to said primary winding, said phase-switched alternating current being insufficient to saturate said core, wherein application of said phase-switched alternating current results in a smoothed alternating current being available at said secondary.

2. An alternating current conditioner according to claim 1, further comprising a tap on said primary winding and means to apply portions of the phase-switched alternating current alternatively to either the entire primary winding or a portion thereof.

3. An alternating current conditioner according to claim 2, wherein a said primary and secondary windings are electrically interconnected.

4. A method for conditioning alternating current comprising:
- providing a magnetic core having a gap;
- providing a primary winding about said core;
- providing a secondary winding about said core, said core providing a common magnetic path for fluxes created by said primary and secondary windings, said common magnetic path passing through said gap;

providing a magnetic shunt that provides a shunt path for said primary flux and a shunt path for said secondary flux, said primary flux shunt path passing through said gap and said secondary flux shunt path bypassing said gap;

providing a capacitor in series with said secondary winding;

providing a tap on said secondary winding; and applying a phase-switched alternating current to said primary winding, said current being insufficient to produce saturation in said core, wherein a smoothed alternating current is available at said secondary tap.

* * * * *